United States Patent Office

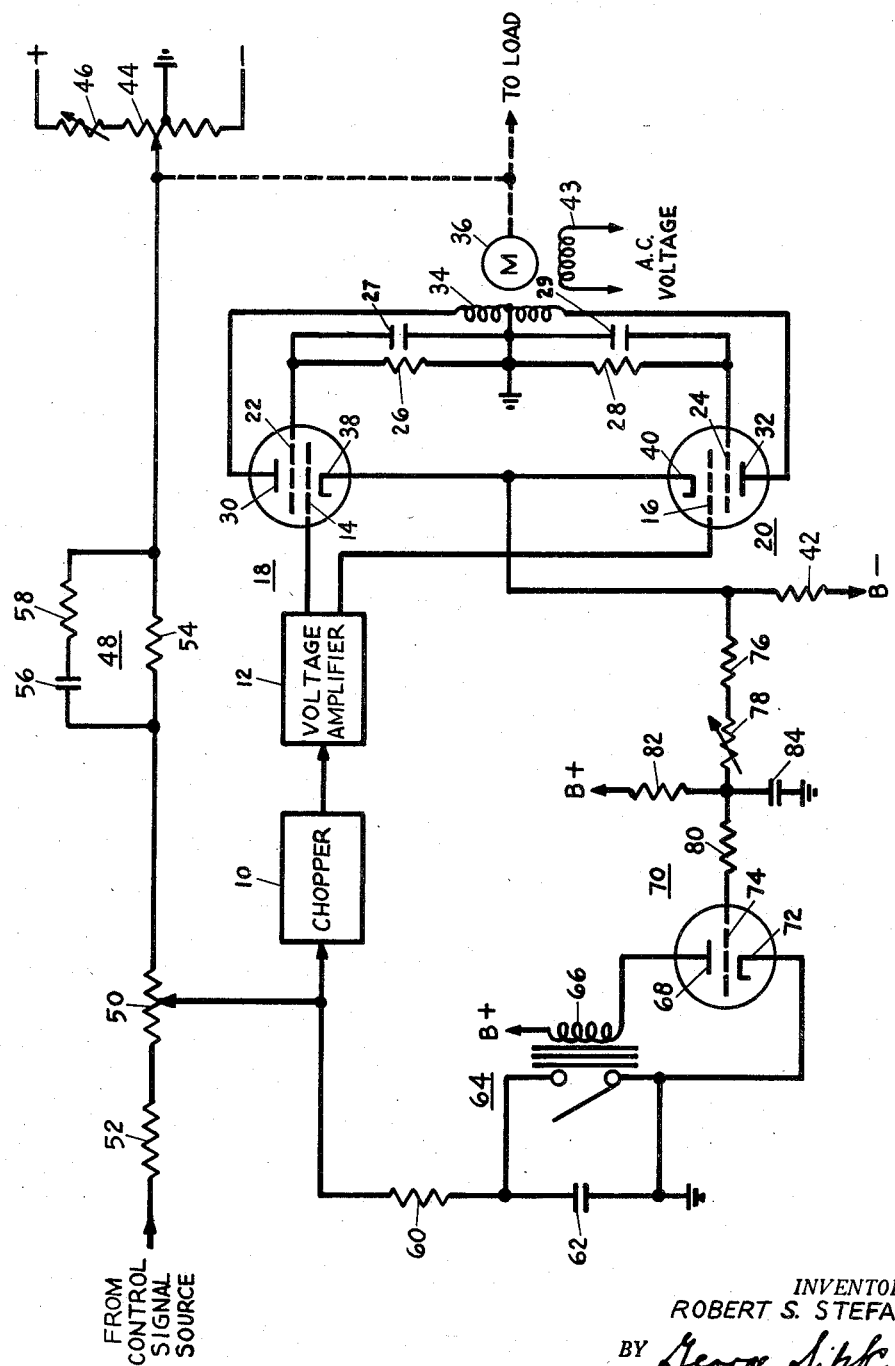

2,849,671
Patented Aug. 26, 1958

2,849,671

INTEGRAL CONTROL FOR SERVOMECHANISMS

Robert S. Stefan, Towson, Md., assignor, by mesne assignments, to the United States of America as represented by the Secretary of the Navy Application October 10, 1956, Serial No. 615,210

11 Claims. (Cl. 318—448)

This invention relates to servomechanisms and, more particularly, to a servomechanism incorporating an improved integral control.

One type of widely used servomechanism, which is well known in the art, consists of a servoamplifier which energizes a servomotor. The servomotor, besides being utilized to operate a mechanical load, also controls the position of the movable tap of a potentiometer, which has a fixed voltage applied thereacross. The movable tap of the potentiometer is connected back to a control signal source through an impedance network. The voltage appearing at an intermediate point of this impedance network is applied to the input of the servoamplifier through a chopper, which converts this voltage into an alternating current signal.

The conventional servomechanism just described operates in the following manner:

The sum of the potentials of the movable tap of the potentiometer and the control signal source is an error which results in an alternating error signal having an amplitude proportional to this sum being applied to the input of the servoamplifier. The phase of this error signal depends upon the polarity of the voltage appearing at the intermediate point of the impedance network.

The application of an error signal to the servoamplifier results in an output proportional to this error signal being applied to the servomotor. The servomotor therefore operates within the linear region of the system at a speed which is proportional to the amplitude of the error signal and in a direction which is dependent on the phase of the error signal. The servomotor moves the tap of the potentiometer in a direction to reduce the amplitude of the error signal.

A derivative damping circuit is included in the impedance network connected between the movable tap of the potentiometer and the control signal source and serves to shape the open loop response curve so that the closed loop system operates with a minimum of overshoot consistent with desired settling time, and also so that the stability of the system is maintained at all times whereby instability or oscillation will not occur during the transient warm-up period of the amplifier nor under any other normal conditions of operation. The derivative damping circuit serves to reduce the amplitude of the error $e$ in accordance with an arithmetic subtractive process namely $$\left(e - K\frac{de}{dt}\right)$$

A conventional servomechanism such as described would only be satisfactory if its error were less than a certain maximum. This invention includes an improved integral control to allow this maximum to be reduced below that of servomechanisms now known. In general, integral control increases the resolution and accuracy of a servomechanism. It has been used to improve steady state behavior of servomechanisms, both at constant velocity and at zero velocity, to reduce the time necessary for correcting errors, and to reduce the magnitude of residual error. In fact the major advantage of integral control lies with its ability to integrate very small errors that exist for extended periods of time and to build up correction voltage of sufficient magnitude so that even the small residual error is substantially corrected. The major disadvantage of integral control circuits has been in the overshoot that they introduce. This invention substantially overcomes this major disadvantage. Although a servoamplifier of higher gain would tend to reduce the time for correcting an error and would tend to reduce the magnitude of residual error, both of which are mentioned above as advantages of integral control, higher gain is attended by more overshooting and less stability. Additionally, gain at higher frequencies causes instability due also to nonlinear or discontinuous elements such as low resolution potentiometers in a loop. Additionally, gain is limited by physical considerations, cost, and reliability.

An object of this invention is to provide a servomechanism wherein the minimum output error necessary to cause the servomotor to operate is considerably reduced.

A further object is to provide a servomechanism with reduced position errors.

A further object is to provide a servomechanism which has greatly increased resolution.

A further object is to provide a servomechanism in which the foregoing objects are achieved without any overshooting.

A further object is to provide a servomechanism having all the advantages of integral control without the usually attendant ill effects of integral control.

Other objects and many of the attendant advantages of this invention will be readily appreciated as the same becomes better understood by reference to the following detailed description when considered in connection with the accompanying drawing wherein:

The sole figure is a block and schematic diagram of a servomechanism incorporating an integral control circuit embodying the principles of this invention.

The drawing includes a conventional servomechanism of the type described above. It includes chopper 10 to which an error signal is applied. The output from chopper 10 is applied as an input to voltage amplifier 12. Voltage amplifier 12 produces a push-pull output.

The push-pull output from voltage amplifier 12 is applied between control electrodes 14 and 16 of electron discharge devices 18 and 20, respectively, which are beam power tetrodes. Screen electrodes 22 and 24 of electron discharge devices 18 and 20, respectively, are connected to a point of reference potential through resistances 26 and 28, respectively, that are shunted by bypass condensers 27 and 29, respectively. Anodes 30 and 32 of electron discharge devices 18 and 20, respectively, are connected to opposite ends of winding 34 of servomotor 36. The center of winding 34 is connected to the point of reference potential. Cathodes 38 and 40 of electron discharge devices 18 and 20, respectively, are tied together and connected to a point of fixed negative potential through resistance 42. Winding 43 of servomotor 36 has a fixed frequency, fixed amplitude alternating voltage applied thereto.

The shaft of servomotor 36, besides being coupled to a mechanical load, is also coupled to the movable tap of potentiometer 44. One end of potentiometer 44 is connected to a point of fixed positive potential through variable resistance 46. The other end of potentiometer 44 is connected to a point of fixed negative potential. The center of potentiometer 44 is connected to the point of reference potential. The variable resistance 46 serves to balance the voltages across the two sides of the potentiometer relative to the point of reference potential.

A derivative damping circuit 48, a potentiometer 50 and a resistance 52 are connected in series between a control signal source, not shown, and the movable tap of potentiometer 44. The derivative damping circuit 48 consists of resistance 54 shunted by serially-connected capacitance 56 and resistance 58, as shown. The signal appearing at the movable tap of potentiometer 50 is applied as the input to chopper 10.

An integral control comprising serially-connected resistance 60 and capacitance 62, is connected between the input to chopper 10 and the point of reference potential. In order that this arrangement not be interpreted in a limiting sense it is to be understood that the integral control could be applied as part of a more complex input network, or it may comprise more than one resistance and/or more than one capacitance.

Capacitance 62 is shunted by normally open relay switch means 64. In order that relay switch means 64 not be interpreted in a limiting sense, it is to be understood that nonlinear circuit elements such as tubes, varistors, diodes, and semiconductor devices such as transistors may be used for shorting or partial shorting. Relay switch means 64 is closed in response to the energization of coil 66 thereof by a signal exceeding a minimum magnitude. Coil 66 of relay switch means 64 is connected between anode 68 of electron discharge device 70 and a point of fixed positive potential. Cathode 72 of electron discharge device 70 is connected directly to the point of reference potential. The signal appearing at tied-together cathodes 38 and 40 of electron discharge devices 18 and 20, respectively, is applied to control electrode 74 of electron discharge device 70 through serially connected resistance 76, variable resistance 78 and resistance 80. The junction of variable resistance 78 and resistance 80 is connected to a point of fixed positive potential through resistance 82, and is also connected to the point of reference potential through capacitance 84.

The derivative damping circuit 48 and the integral control 60, 62 are portions of the feedback impedance network. The transfer function from the movable tap of potentiometer 44 to the input of chopper 10 is determined by the feedback impedance network.

The operation of the device shown in the drawing will now be described. Any signal appearing at the input to chopper 10 is converted into an alternating current signal by chopper 10 and is then applied as the input to voltage amplifier 12. The phase of this alternating current signal depends upon the polarity of the signal applied as the input to chopper 10, and the amplitude of this alternating current signal depends upon the level of the signal applied as the input to chopper 10. The push-pull output of voltage amplifier 12 is applied as the input to electron discharge devices 18 and 20. Electron discharge devices 18 and 20 operate as substantially constant current amplifiers which energize winding 34 of servomotor 36. This causes servomotor 36 to rotate in a direction determined by the relative phase of the output of electron discharge devices 18 and 20, which flows through windings 34, with respect to the phase of the fixed frequency A. C. voltage energizing winding 43 of servomotor 36. It will be seen that this relative phase is ultimately dependent upon the polarity of the signal applied as an input to chopper 10. The speed of rotation of servomotor 36 is determined by the amplitude of the output of electron discharge devices 18 and 20 which flows through winding 34 of servomotor 36. This amplitude ultimately depends upon the level of the signal applied as an input to chopper 10.

Since the movable tap of potentiometer 44 is mechanically linked to servomotor 36, the position of the movable tap of potentiometer 44 will be altered in response to the operation of servomotor 36.

The level of the potential appearing at the movable tap of potentiometer 44 is determined by the position of the movable tap and by the magnitude of the voltage impressed across potentiometer 44. The magnitude of the voltage impressed across the upper half of potentiometer 44 may be adjusted to a predetermined value by means of variable resistance 46, in order to balance the output signal for equal mechanical displacements.

The feedback impedance network, consisting of derivative damping circuit 48, potentiometer 50, resistance 52, and the integral control circuit 60, 62, forms a voltage divider between the movable tap of potentiometer 44 and the control signal source. The level of the signal appearing at the movable tap of potentiometer 50, which is applied as an input to chopper 10, is a function of the potential of the control signal, the potential at the movable tap of potentiometer 44, and the relative values of the impedances of the feedback impedance network to the left and the right of the movable tap of potentiometer 50 and of the integral control circuit. Positioning the movable tap of potentiometer 50 permits initial adjustment of the relative value of impedances of the impedance feedback network to the left and the right of the movable tap of potentiometer 50. However, the relative value of the impedances to the left and right of the tap of potentiometer 50 is also dependent upon the speed of servomotor 36. This is true because the magnitude of the impedance presented by derivative damping circuit 48 is a function of the frequency components of the signal applied from the movable tap of potentiometer 44, which in turn, is dependent upon the speed of servomotor 36. This will be seen from the fact that at low speeds, where the effective impedance of capacitance 56 is an open-circuit, the impedance of derivative damping circuit 48 is substantially equal to resistance 54, while at high speeds, where the effective impedance of capacitance 56 is a short-circuit, the impedance of derivative damping circuit 48 is substantially equal to resistance 54 in parallel with resistance 58. The derivative damping circuit introduces error rate damping to improve stability. A servomechanism including a derivative damping circuit as described above produces an error signal which is not proportional solely to the magnitude of position error as is the case in servomechanisms not including derivative damping circuits. A servomechanism including a derivative damping circuit produces an error signal which is proportional to the arithmetic difference of two components, one component being proportional to the magnitude of position error and the other component being proportional to the rate of change of position error i. e.

$$\left(e - K\frac{de}{dt}\right)$$

The operation of the integral control, which forms the subject of this invention, will now be discussed. When the error between the potential at the movable tap of potentiometer 44 and the level of the control signal is large, the signal applied to chopper 10 also tends to be large. This causes a large output signal from voltage amplifier 12 to be applied as an input to push-pull electron discharge devices 18 and 20, respectively. This increases the total current drawn by both electron discharge devices 18 and 20, and hence the voltage drop across cathode resistance 42, making the potential at cathodes 38 and 40 more positive. A portion of the potential at cathodes 38 and 40 of electron discharge devices 18 and 20 appears at control electrode 74 of relay driver amplifier 70. This portion of the potential at cathodes 38 and 40 may be adjusted by means of variable resistance 78 to provide a means of adjusting the operating point of relay 64. When the potential applied to the control electrode of relay driver amplifier 70 exceeds a given level, the energization of coil 66 is sufficient to close relay 64, short circuiting capacitance 62.

When capacitance 62 is shortcircuited, the input to chopper 10 is shunted by resistance 60 which serves to reduce the magnitude of the low frequency and D. C. components of the signal applied to the chopper 10. The high frequency components of the signal are substantially unaffected since they encounter negligible impedance in the capacitor 62 when the capacitor is not shorted. The zero of the integral control is below the zero of the derivative damping circuit so that interference between the two networks is at a minimum. Bypassing of the capacitor 62 has no effect on the output of the derivative damping circuit.

However, as the error is reduced, a point is reached where the potential at cathodes 38 and 40 of electron discharge devices 18 and 20 is no longer sufficiently positive to maintain relay 64 in its closed position. Therefore, relay 64 opens, placing capacitance 62 in series with resistance 60. This increases the low frequency impedance shunting the input to chopper 10, thereby increasing the magnitude of the low frequency components of the input signal applied to chopper 10.

If capacitance 84 were not present in the input to relay driver amplifier 70, the effect of opening relay 64 would be to increase the positive potential at cathodes 38 and 40 of electron discharge devices 18 and 20 sufficiently to again close relay 64. The total effect would be to cause relay 64 to chatter until the error was reduced to the point where the level of the input signal applied to chopper 10 even with relay 64 open were insufficient to produce a positive potential at cathodes 38 and 40 capable of closing relay 64.

However, with capacitance 84 present, the potential appearing at the control electrode 74 of relay driver amplifier 70 does not immediately follow the potential at cathodes 38 and 40 of electron devices 18 and 20, so that there is a time delay in the opening of relay 64. When relay 64 finally does open, the error already has been reduced to the point where the output at cathodes 38 and 40 even with relay 64 open is insufficient to effect re-energization of relay 64. Therefore, relay 64 does not chatter.

The shunt impedance presented by resistance 60 in series with capacitance 62 is an inverse function of frequency. Therefore, the magnitude of the shunt impedance and hence the relative level of the input signal applied to the input to chopper 10 is greater at lower frequencies than at higher frequencies. The frequency components contained in this input signal are directly proportional to the speed of servomotor 36 and the speed of servomotor 36 is proportional to the energization thereof. After the opening of relay 64, as the error still continues to be reduced, the energization and hence the speed of servomotor 36 tends to decrease. This tendency, however, is counteracted in large part at lower speeds by the larger shunting impedance of the resistance 60 and capacitance 62 on the input applied to chopper 10.

Another advantage of the invention is that the maximum input signal applied to the chopper 10 is reduced thus providing longer life for the chopper contacts.

The most significant advantage provided by this invention over the prior art is in reduced overshoot. Because the relay switch is closed under big error conditions and opens only under small error conditions, the capacitor 62 is effective only for small error conditions. This is important because if the capacitor were not shorted under large error conditions the capacitor would charge to an extent such that it would not discharge in time to prevent overshoot. The reduction in overshoot is accomplished at no sacrifice in the reduction in steady state error conventionally afforded by integral control. The relay permits the integral control to be effective when necessary without the undesirable long time constant of capacitor 62 causing overshooting.

Obviously many modifications and variations of the present invention are possible in the light of the above teachings. It is therefore to be understood that within the scope of the appended claims the invention may be practiced otherwise than as specifically described.

I claim:

1. In a servomechanism, amplifier means, an integral control having a capacitance means, said integral control being connected to the input of said amplifier means, shunting means connected across at least a part of said capacitance means, means connected between said shunting means and said amplifier means whereby the impedance of said shunting means is decreased with increased signal input to said amplifier means in a predetermined relationship, said means connected between said switch means and said amplifier means including time delay means to preclude chattering of said switch means.

2. A servomechanism comprising a servomotor, amplifier means connected to said servomotor, first means including a movable element that is mechanically linked to said servomotor for providing a first signal having a level which is a function of the position of said movable element, second means connected to said movable element and adapted for connection to a source of control signal, said second means having an output terminal connected to the input of said amplifier means and providing thereto a third signal which is direct function of the sum of the control signal and said first signal, an integral control having a capacitance means, said integral control being connected to the input of said amplifier means, shunting means connected across at least a part of said capacitance means, third means connected between said shunting means and said amplifier means whereby the impedance of said shunting means is decreased with increased signal input to said amplifier means in a predetermined relationship, said shunting means being a normally open switch means that is closed when signal input to said amplifier means exceeds a predetermined threshold, said means connected between said switch means and said amplifier means including time delay means to preclude chattering of said switch means.

3. A servomechanism comprising a servomotor; a potentiometer having a movable tap; means connecting the center of said potentiometer to a point of reference potential; a source of constant potential connected across said potentiometer; means mechanically linking the movable tap of said potentiometer to said servomotor; a derivative damping circuit connected at one end to the tap of said potentiometer; a second potentiometer having a movable tap and having one end thereof serially connected to the other end of said derivative damping circuit; a resistance having one end thereof connected to the other end of said second potentiometer and adapted for connection at its other end to a control signal source; a serially-connected resistance and capacitance connected between the movable tap of said second potentiometer and said point of reference potential; a chopper connected at its input end to the movable tap of said second potentiometer; a voltage amplifier producing a pushpull output in response to an input applied thereto connected at its input end to the output end of said chopper; a pushpull power amplifier connected at its input end to the output end of said voltage amplifier and including first and second electron discharge devices having respective cathodes which are tied together, a resistance connected between said cathodes and a point of fixed negative potential; the output end of said power amplifier being connected to said servomotor to effect the operation thereof; a relay driver amplifier; variable resistance means connected at one end to the cathodes of said first and second electron discharge devices; resistance means connected between the other end of said variable resistance means and the input end of said relay driver amplifier; a resistance connected between a point of fixed positive potential and the other end of said variable resistance means; a capacitance connected between the other end of said variable resistance means and said point of reference potential; a relay including a normally open switch and an operating coil; said switch of said relay being connected across said first-mentioned capacitance; the output of said relay driver amplifier being connected to said coil of said relay to effect the operation thereof.

4. A servomechanism control comprising a servomotor having a winding which controls its operation, a potentiometer having a movable tap mechanically operated by said servomotor, means connecting the center of said potentiometer to a point of reference potential, a source of constant potential connected across said potentiometer, a signal source, a connection between said source and said tap of said potentiometer and having in series therein a feedback impedance network including a second potentiometer with a movable tap, a chopper connected to said movable tap of said second potentiometer, means connected between said chopper and said servomotor for amplifying current from the chopper and energizing said winding of said servomotor, an integral control circuit having in series therein a resistance and a condenser, connected at one end to said movable tap of said second potentiometer and at its other end to a reference potential, a relay having a normally open switch connected across said condenser, a triode vacuum tube having in series in its plate circuit, said relay and a source of fixed positive potential, and means controlled by said means for energizing said servomotor winding and connected to the controlling electrode of said triode for causing a closing of said relay switch when the potential on said grid exceeds a selected minimum.

5. The mechanism as set forth in claim 4, and time delay means connected to said grid for delaying opening of said relay switch after its closing and thereby precluding chattering of said relay switch.

6. A servomechanism control comprising a servomotor with a winding that controls its operation, a potentiometer having a movable tap, means connecting said tap for mechanical operation by said servomotor, a signal source, circuit means connecting said signal source and said movable tap and having in series therein an impedance network, a source of fixed potential connected to the ends of said potentiometer, a chopper connected to said circuit means intermediate of its ends, means connected between said chopper and winding for amplifying signal voltages from said chopper and applying control currents to said winding to control operation of said servomotor, said last named means including a push-pull electronic control employing two tetrode electron discharge devices, means for connecting the screen electrodes of said devices to a point of reference potential through resistances shunted by by-pass condensers, means connecting the cathodes of said devices to a point of fixed negative potential through a resistance, an integral control circuit connected at one end to said circuit means and at its other end to a point of reference potential and having in series therein a resistance and a condenser, a relay having a normally open switch connected to control circuit in shunt across said condenser, a triode electron discharge device, a circuit for said relay connected between a fixed positive potential and a point of reference potential and having in series therein said relay and the anode and cathode of said triode electrode discharge device, means connecting the grid of said triode device to said cathodes of said tetrode electron discharge devices and having a plurality of resistances in series therein, and means connecting said last named means, at a point between two of said resistances, through a resistance to a fixed positive potential, and separately therefrom also through a condenser to a reference potential.

7. A servomechanism control comprising a servomotor with a winding that controls its operation, a potentiometer having a movable tap, means connecting said tap and servomotor for operation of the tap by the servomotor, means connecting an intermediate part of said winding to a reference potential, a signal source, circuit means connecting said signal source with said movable tap and having in series therein an impedance network, a chopper connected to said circuit means at a point thereof intermediate of said network, means connected to said chopper to receive chopped signals therefrom and control the operation of said servomotor through current supplied to said winding, an integral control circuit connected at one end to the part of the circuit means to which the chopper is connected and at its other end to a point of reference potential, and having in series therein a resistance and a condenser, a relay having a normally open switch connected in shunt across said condenser, a triode electron discharge device having its anode connected through said relay to a fixed positive potential and its cathode connected to a point of reference potential, control means connected between said means for receiving chopped signals from the chopper and the control grid of said triode electron discharge device for controlling said relay to close it from the control for said servomotor.

8. The mechanism as set forth in claim 7, and a connection between said control means and a reference potential and having a condenser in series therein for causig a time delay in the reopening of said relay switch after it has been closed to shunt the condenser of said integral control circuit.

9. The mechanism as set forth in claim 7, wherein said impedance network includes as an element thereof a derivative damping circuit in the portion of said circuit means between said potentiometer tap and the connection to said chopper.

10. A servomechanism control comprising a servomotor having a winding which controls its operation, a signal source, means controlled by said source for controlling the operation of said servomotor in accordance with signals from said source, integral control means connected in shunt to said first means and having in series therein a resistance and a condenser, with a switch connected in shunt across said condenser, an electromagnet for closing said switch, with the switch normally open, a triode electron discharge device having anode, cathode and control grid, means connecting said anode to a fixed positive potential and having said electromagnet in series therein, means connecting said cathode to a point of reference potential, and means connected to said grid and controlled by said first means for varying the potential on said grid and causing current flow through said electromagnet to shunt said condenser when said signal from said source exceeds a selected minimum magnitude during an operation of said servomotor.

11. The mechanism as set forth in claim 10, and time delay means connected to said grid for causing a time delay in the opening of said switch after it has been closed during an operation of said servomotor.

References Cited in the file of this patent
UNITED STATES PATENTS
2,668,264    Williams _____ Feb. 2, 1954